Dec. 3, 1968   W. KOENIG   3,414,062
DEVICE FOR CONTROLLING THE WORKING DEPTH OF
SOIL WORKING IMPLEMENTS
Filed Oct. 12, 1964   7 Sheets-Sheet 6
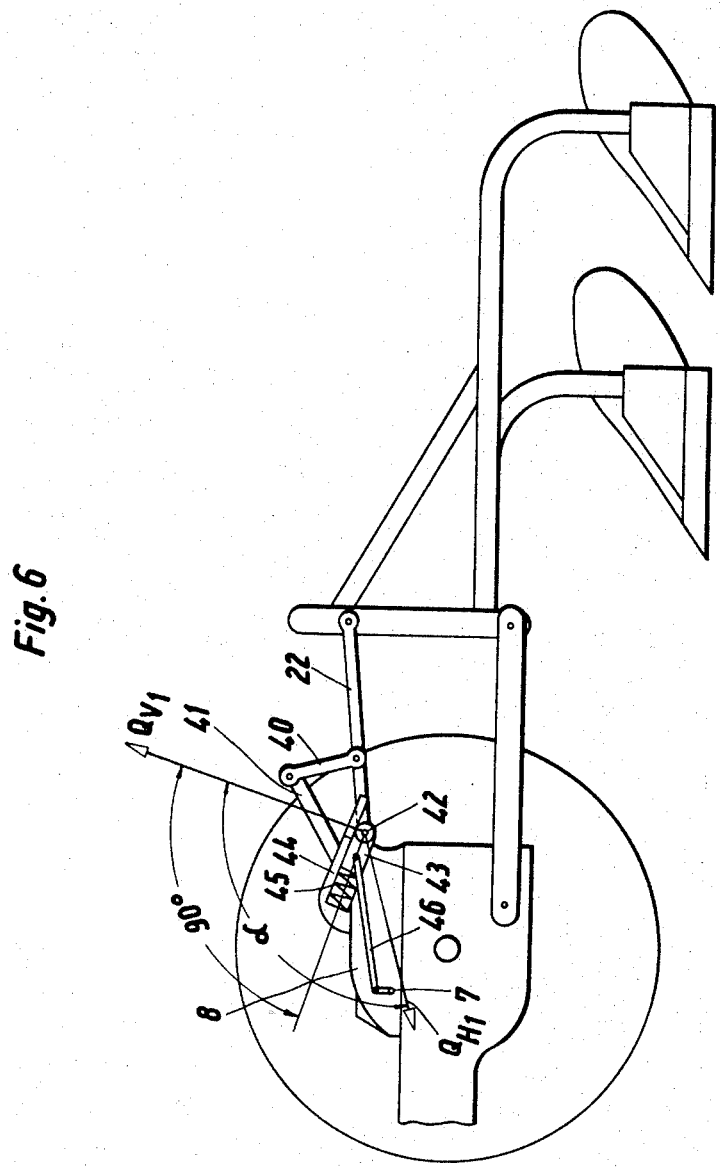
Inventor:
Walter Koenig

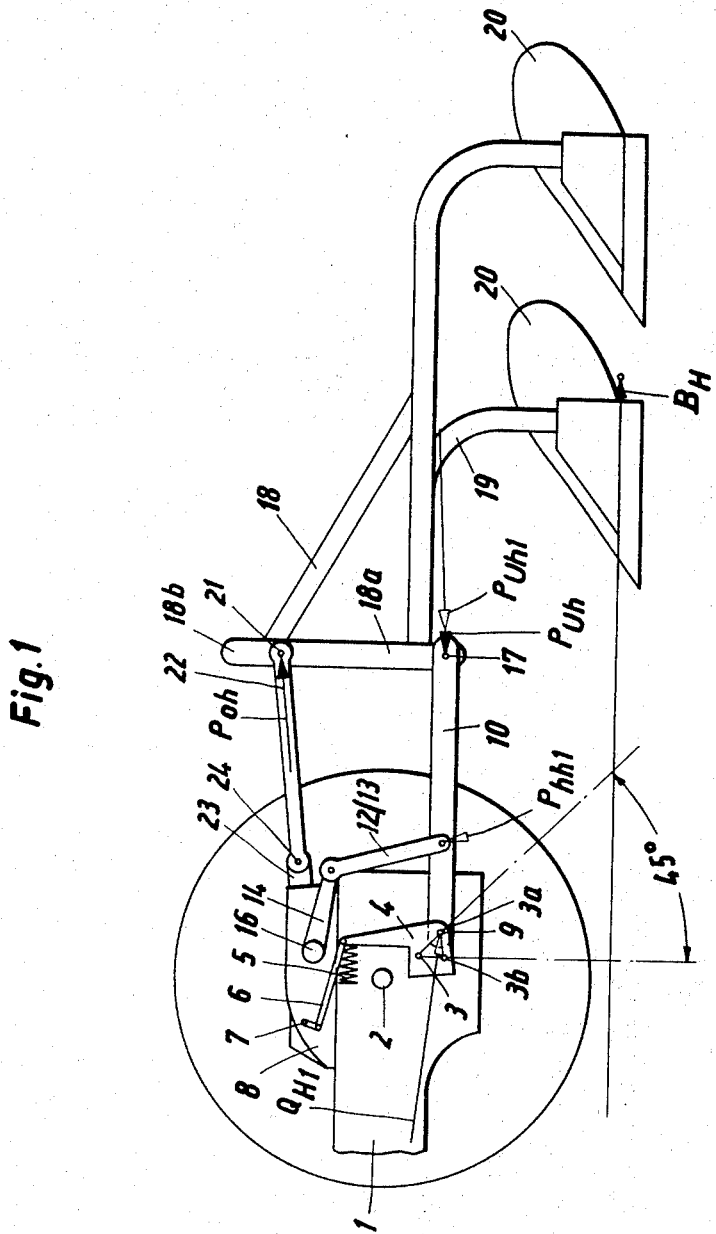

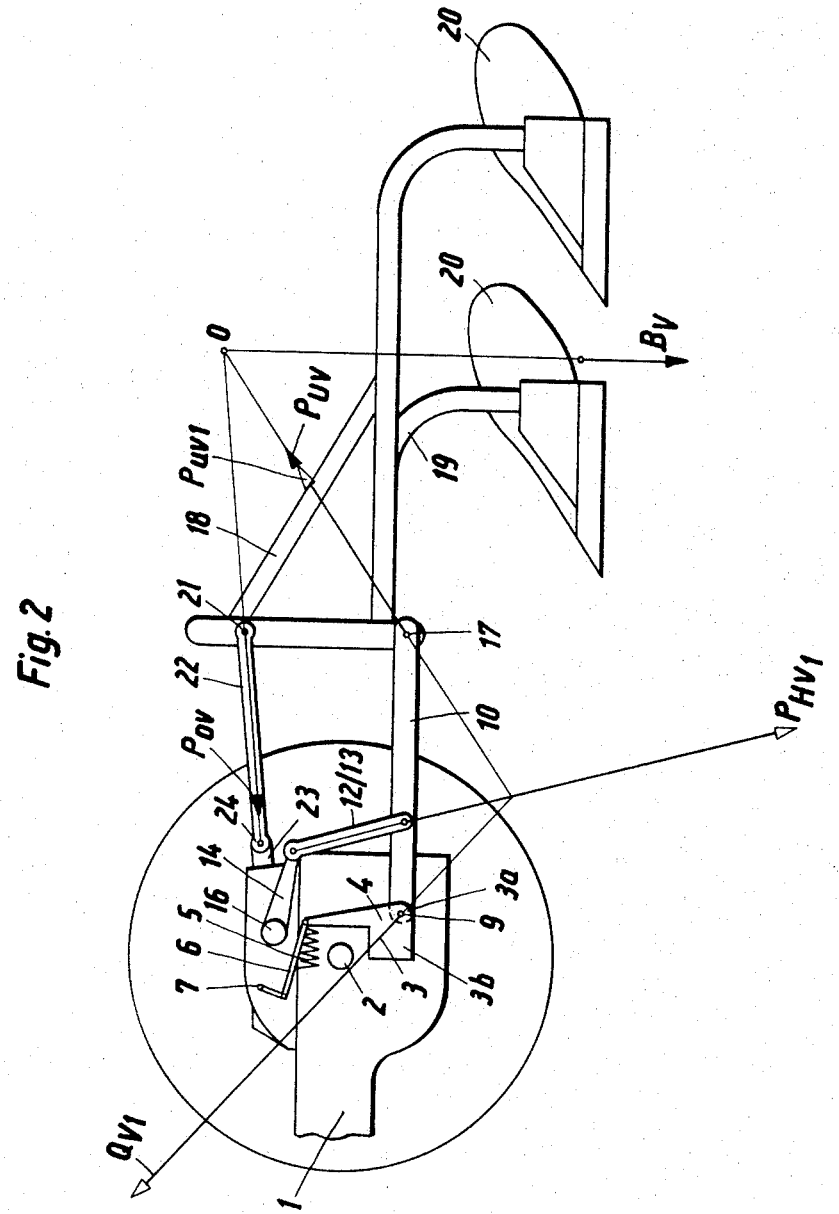

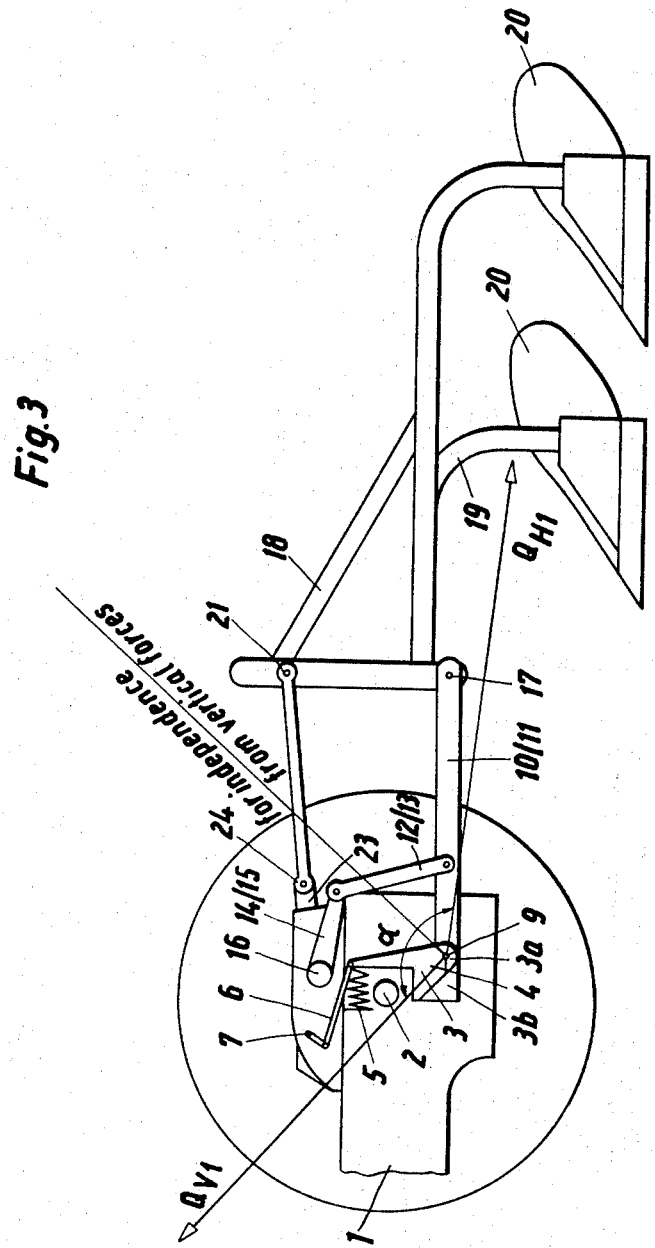

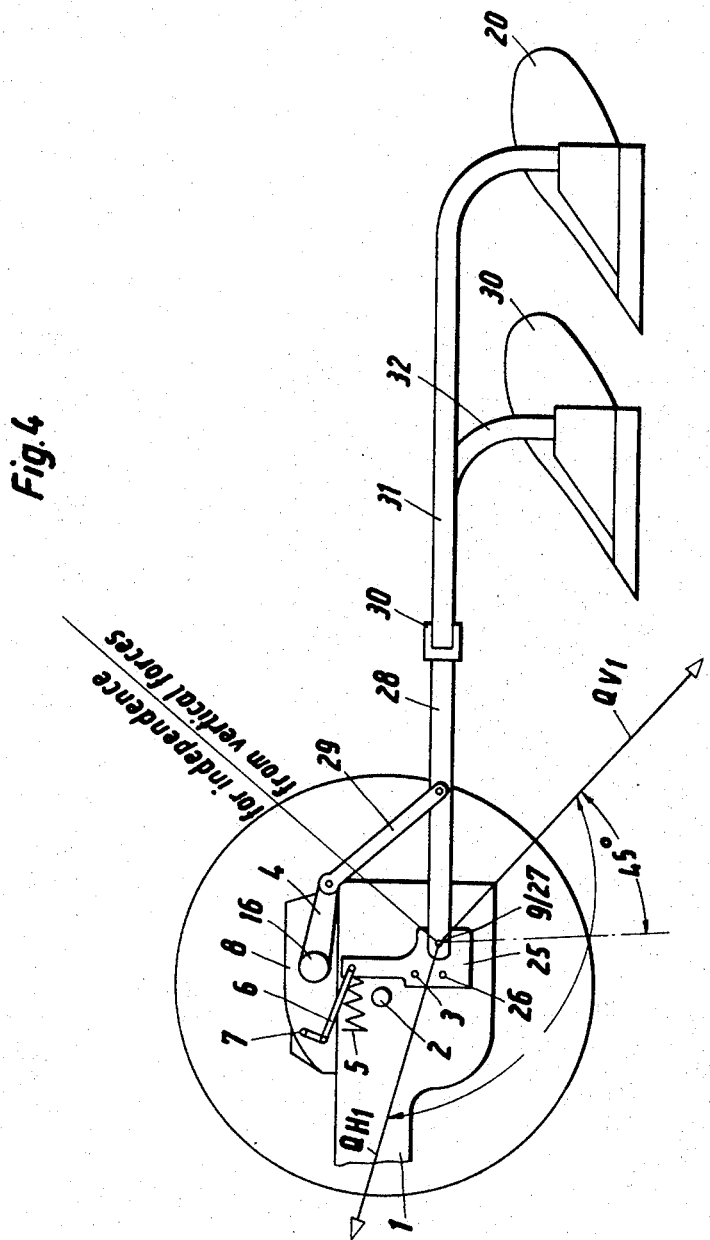

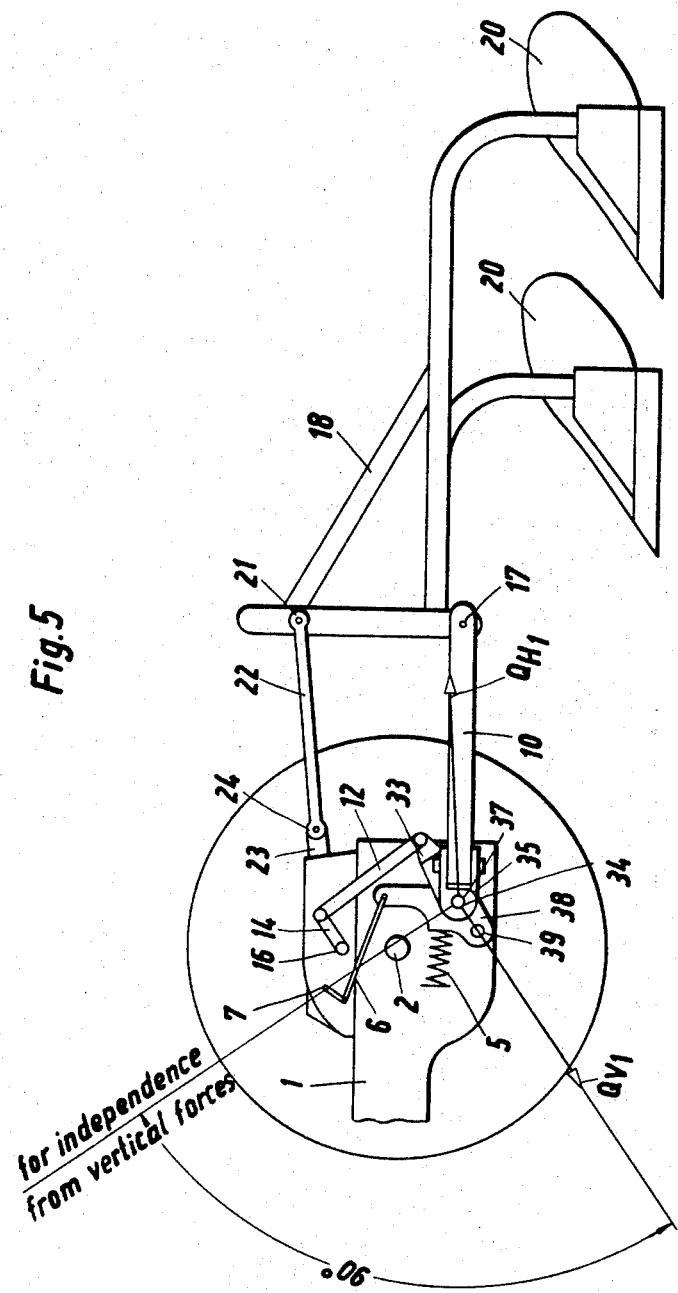

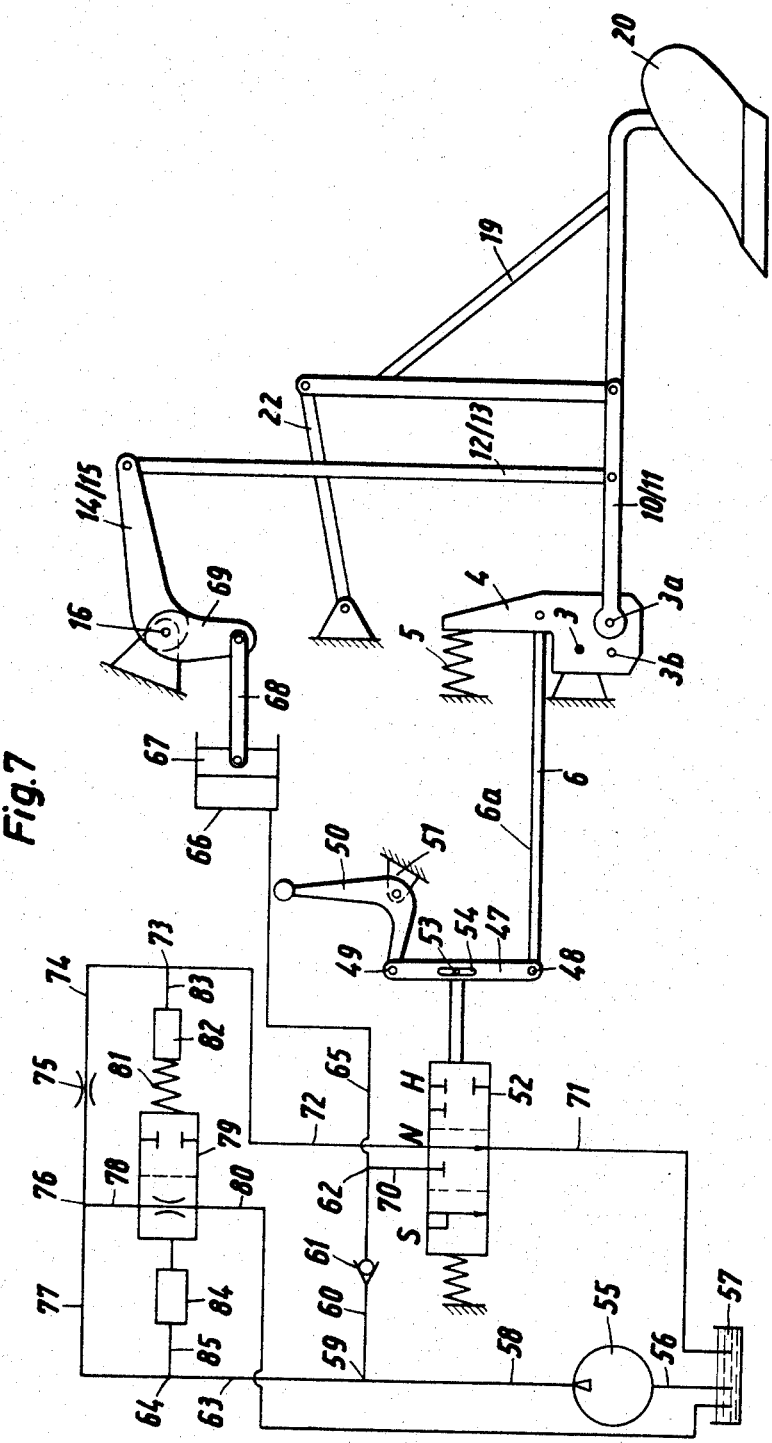

United States Patent Office 3,414,062
Patented Dec. 3, 1968

3,414,062
DEVICE FOR CONTROLLING THE WORKING DEPTH OF SOIL WORKING IMPLEMENTS
Walter Koenig, Bergisch-Gladbach, Germany, assignor to Klöckner-Humboldt-Deutz Aktiengesellschaft, Cologne, Germany
Filed Oct. 12, 1964, Ser. No. 403,010
3 Claims. (Cl. 172—7)

ABSTRACT OF THE DISCLOSURE

A tractor having control means responsive to changes in draft force to automatically adjust the depth of penetration of a towed earth working implement by raising or lowering the tractor draft arms and the linkage of the control means being connected to the draft arms and having a positional relationship, to the draft arms and means for lifting the same, such that vertical components of force will not cause any operation of the linkage of the control means.

---

The present invention relates to an arrangement for controlling the working depth of a soil working implement the tool of which when in working position is subjected to a force directed into the soil. This tool is actuated, i.e. lifted and lowered, by a power operated lifting mechanism of a tractor moving said soil working implement, while an impulse caused by the pulling force is exerted upon the control member of said lifting mechanism for controlling the working depth of said tool.

Arrangements of the above mentioned type are known in which the soil working implement is by means of a link system connected to the tractor, and in which the change in the force exerted by the soil upon the soil working implement is ascertained as a function of the force effective in one or more of the link members. This ascertainment of the force is effected by power measuring means, and the ascertained force is taken advantage of for effecting the control. The force which is effective at an imaginary power center of the linkage—soil working implement is composed of a horizontal force exerted by the soil resistance and a vertical force brought about by the soil resistance and the effective weight of the linkage—soil working implement. The power measuring member thus measures a force which is composed of a component resulting from a horizontal force exerted by the soil resistance upon the implement and of a component resulting from a vertical force which is exerted by the soil resistance and the weight of the implement upon the implement. With certain soil conditions in which, for instance with the same horizontal force, a change in the vertical force occurs, the fact that the measurement is dependent on both components results in that a change in the auxiliary control factor will be effected only by that component acting upon the power measuring member which is caused by the vertical force acting upon the implement.

Inasmuch as the control mechanism is intended to keep the preselected value of the auxiliary control factor constant, the control mechanism will, when deviations occur, change the working depth of the soil working implement by means of the power operable lifting mechanism. As a result thereof, there will be a change in the value of the horizontal force affecting the auxiliary control factor which value should be kept constant with a pulling force control. Contrary to its task proper, in this instance the control mechanism keeps constant the value of a force which originates as auxiliary factor with the vertical force acting upon the soil working implement, or it keeps constant an indefinite medium value of a force which originates with a vertical and horizontal force acting upon the implement.

The heretofore known devices of the type involved, therefore, have the drawback that the force employed as auxiliary control factor and used for the control does not represent an optimum auxiliary value for the control.

It is, therefore, an object of the present invention to provide an arrangement of the type involved, which will overcome the above-mentioned drawbacks.

It is another object of this invention to provide an arrangement for controlling the working depth of a soil working implement, in which the control for varying the working depth of the soil working implement tool is dependent only on the horizontal force which during the movement of the implement will be exerted by the soil resistance on the soil working tool of the implement.

It is another object of this invention to provide an arrangement as set forth above, in which the pulling or horizontal force is actually kept constant and will be independent of the variations of the soil conditions and will also be independent of the weight of the implement.

These and other objects and advantages of the invention will appear more clearly from the following specification in connection with the accompanying drawings, in which:

FIG. 1 diagrammatically illustrates a plow linked to the rear part of a tractor by a three-point linkage, said figure also showing the horizontal force acting upon the plowshare and the effect of said force upon the member which carries out the measuring of the pulling force.

FIG. 2 illustrates the same arrangement as FIG. 1 and shows the effect of the vertical force, which acts upon the plowshare, upon the member supported in conformity with the invention and effecting the measuring of the pulling force.

FIG. 3 likewise shows the same arrangement as illustrated in FIG. 1 with the vertical and horizontal forces acting at the linkage point of the member measuring the pulling force, said figure also showing the range which is most favorable for the measurement.

FIG. 4 diagrammatically illustrates a plow linked in conformity with the present invention to a tractor by means of a one-joint coupling, said figure also indicating the two power components effective in the linkage point.

FIG. 5 diagrammatically illustrates a plow linked in conformity with the present invention to a tractor by means of a three-point linkage system, the lifting member of the power operable lifting device acting upon the lower link and, more specifically, that end thereof which is adjacent the tractor.

FIG. 6 illustrates a plow linked by means of a three-point linkage system to a tractor while the lifting member of the power operable lifting device acts upon the upper link which is supported in conformity with the present invention.

FIG. 7 represents an arrangement in which in addition to the arrangement of FIGS. 1 to 3 there is illustrated the hydraulic part of the power lifting means of the tractor.

As mentioned above, the present invention concerns an arrangement for controlling the working depth of a soil working implement the tool of which, when in working position, is subjected to a force directed into the soil which tool is raised and lowered by a power operable lifting mechanism of a tractor moving the implement, while the control member of the power operable lifting mechanism is acted upon by an impulse caused by the pulling force for controlling the working depth of the tool. An arrangement of this type is characterized according to the present invention by connecting the soil working implement to the tractor in such a way that the component of the reaction force which is created by a force acting upon the tool and directed into the soil is supported by a fixed point in a direction perpendicular to the direction in which said reaction force acts. Thus, the control member of the power operable lifting mechanism is subjected only to that component of the pulling force which acts upon the working tool in the direction in which the implement is being pulled.

With an arrangement of this type, the pulling force impulse ascertained by the measuring element and employed as auxiliary control factor is almost independent of the force acting upon the tool and directed into the soil. Thus, a control arrangement which is based on the measurement and maintaining such ascertained auxiliary factor constant has the advantage that the pulling force (horizontal force) is actually constant and independent of the variations in the soil condition and is also independent of the weight of the implement.

Referring now to the drawings in detail, and FIG. 1 thereof in particular, the arrangement shown therein illustrates the rear portion of a transmission housing 1 of a tractor. Near the rear axle of said tractor, a two-arm intermediate lever 4 is tiltably journalled on a bearing stud 3. Said lever 4 in cooperation with a pressure spring 5 preceding the upper end of said lever 4 serves as pulling force measuring member of a control mechanism for measuring the working depth of a soil-working implement. As will be evident from the drawing, spring 5 rests on the transmission housing 1.

The upper end of intermediate lever 4 is, through the intervention of a linkage arm 6, coupled to a shaft 7 of a control member pertaining to a power operable lifting device 8 arranged on the transmission housing 1. That end of lever 4 which is located lower than the axle 2 has two connecting bores 3a, 3b serving as linkage points. The connecting lines of said bores 3a, 3b with the central axis of pivot 3 confine an angle of 45°. By means of a coupling bolt 9, the lower linkage arm 10 of a three-point linkage system is linked to the connecting bore 3a. Said lower link 10 is coupled to the lifter arms 14 of the lifter shaft 16 of the power operable lifting mechanism 8 by means of a link 12 the linkage point of which with arm 10 is located near the central portion of link 10. A linkage system corresponding to the linkage systems 10, 12 and 14 is also provided on the other side of the transmission housing 1. To that end of link 10 which is remote from the transmission housing 1 there is by means of a shaft 7 linked the lower portion 18a of a frame system 18 for a plow 19 serving as soil-working implement. Merely for the purpose of example, plow 19 has been shown equipped with two plowshares 20. The upper portion 18b of frame 18 is, by means of a coupling bolt 21, coupled to that end of an upper link 22 of a three-point linkage system which is remote from the transmission housing 1. That end of link 22 which is adjacent said transmission housing 1 is by means of coupling bolt 24 pivotally connected to a bearing support 23 of the power lifting mechanism 8.

As will be obvious from the power diagram of FIG. 1, the horizontal component $B_H$ of the soil resistance acts upon the plowshare 20. This horizontal component $B_H$ will in the upper link 22 produce a force $P_{oh}$ the line of action of which extends along the central longitudinal axis of the upper link 22 and intersects the line of action of force $B_H$ in elevation in a point outside the drawing. The resultant of the said two forces is a force $P_{uh}$ the line of action of which intersects shaft 17 of the lower portion 18a of the plowframe 18. In conformity with the lever ratios of shaft 17 as they prevail at the linkage point of frame 18, said force $P_{uh}$ splits into a force $P_{uh1}$ acting upon that end of link 10 which is remote from the transmission housing 1, and into a force acting upon the link corresponding to link 10 and located on the other side of transmission housing 1. The lines of action of said two forces will, when parallel link arms are involved, be located in the same plane. The force $P_{uh1}$ thus determined as to its effective direction and magnitude, will in lifter rod 12 produce a force the line of action of which passes through the longitudinal central axis of lifter rod 12 and will also produce a force $Q_{H1}$ acting at the pivot connection of lever 4 with that end of link 10 which is adjacent the transmission housing 1. This force $Q_{H1}$ serves as auxiliary control force. The magnitude and direction of force $Q_{H1}$ acting at pivot point 9 is determined by the power diagram of the forces $P_{Hh1}$ and $P_{uh1}$.

As will be seen from FIG. 2, in addition to the horizontal force $B_H$, a vertical force $B_V$ acts upon the plow 19. The vertical force $B_V$ is composed of the vertical ground resistance which originates from the lifting work of the two plowshares and the weight of the plow itself. The force $B_V$ thus represents the sum of the forces added in conformity with the law of statics of the vertical ground resistance at the two plowshares 20 and the force of the weight of the plow acting in the center of gravity of the plow. The vertical attack of the force $B_V$ on the plow is effected at a certain distance from the axis 17 and the coupling bolt 21 of the implement attaching device. This distance of the power attack of force $B_V$ is likewise determined in conformity with known laws of statics. The force $B_V$ acts as turning force with the above mentioned distance as lever arm on plow 19. This turning force is absorbed by the linkage of the attachment by a pressure force $P_{OV}$ which coincides under normal conditions as to its effective direction with the longitudinal central axis of the upper link. This turning force is furthermore absorbed by the pivot 17 by means of a force $P_{UV}$. Since the magnitude of the force $P_{OV}$ can, in view of the fact that the force $B_V$ is known with regard to its magnitude and direction, be determined by the laws of statics, and since these two forces as to their effective directions pass through an imaginary power center O, it is possible by the laws of statics also to determine the magnitude and the effective direction of the force $P_{UV}$. As a result thereof, the effective direction of the force $P_{UV}$ will pass through pivot 17 and the imaginary power center O. Since the two forces $P_{OV}$ and $B_V$ are known it will be obvious that from the force diagram which is determined as to the effective directions, it is possible also to determine the magnitude of the force $P_{UV}$. The force $P_{UV}$ which balances the two forces $P_{OV}$ and $B_V$ splits similar to the force $P_{Uh}$ in conformity with the lever ratio of pivot 17 at those ends of the lower link which faces away from the tractor, into a first force for the link 10 and into a second force for the link 11, the lines of action of which will with parallel links extend in the same plane as the force $P_{UV}$.

As will furthermore be evident from FIG. 2 the first force which is likewise known as to its magnitude and effective direction, acts at the lower link 10 as an inclined attacking pulling force and tends to turn the link 10 in a counter clockwise direction which it is, however, prevented to do by the lifter rod 12. The first force which acts in a rotative manner upon link 10 thus partially balances a force $P_{HV1}$ the effective line of which coincide with the central longitudinal axis of the lifter rod 12. Link 10 is furthermore prevented from turning by a force $Q_{V1}$ attacking in the coupling bolt 9. This force can be determined in conformity with the laws of statics by the construction of a force diagram from the known power $P_{UV1}$ which is known as to its magnitude and its effective direction, and from the power $P_{HV1}$ in the effective direcion force $Q_{V1}$, the intermediate lever 4 is supported which in conformity with the invention takes over the measuring of the pulling force. Thus, the connecting line from the linkage point 3a for the lower link 10 to the linkage point 3 of the intermediate lever 4 on the transmission housing 1 extends in the effective direction of the force $Q_{V1}$. Inasmuch as the force $Q_{V1}$ thus cannot exert a lever action upon the intermediate lever 4, it will according to the invention not be able to tilt the lever 4 in any direction about the point 3.

On the other hand, as mentioned in connection with FIG. 1, the force $Q_{H1}$ acts only in a rotating direction on the intermediate lever 4 about its pivot 3. As measuring magnitude for the control of the working depth of the built-on plow, thus only a force will serve which originates from force $B_H$ acting as a horizontal force upon the tool 20 of the plow 13. Consequently, the working depth of the built-on plow 19 is in conformity with the invention controlled only in confromity with the horizontal force $B_H$.

As will likewise be obvious from the power diagram, it is possible primarily to influence the direction of the force $Q_{v1}$ to a great extent by the selection of the pivot point and pivot direction of lifter rod 12 with the lower link 10 so that, in conformity with the showing of FIG. 3, the lines of action or forces $Q_{H1}$ and $Q_{v1}$ will be spread by an angle α. As is further obvious from FIG. 3, a force $Q_{H1}$ independent of force $Q_{v1}$ and thus independent of force $B_v$ is obtained as auxiliary control force for controlling the working depth when the tilting of the lever 4 produced by force $Q_{H1}$ is effected perpendicularly with regard to the line of action of force $Q_{v1}$.

In the arrangement according to FIG. 4, a two-arm lever 25 instead of lever 4 is pivotally connected to a bearing stud 3 of transmission housing 1. This lever 25 in co-operation with a pressure spring 5 preceding the upper end of lever 25 and resting on the transmission housing 1 serves as measuring member for the pulling force. The upper end of lever 25 is through the intervention of a link 6 coupled to shaft 7 of a control member of the power operable lifting mechanism 8 mounted on the transmission housing 1 of the tractor. The lower end of lever 25 which is located below shaft 2 is provided with connecting means 26, 27. The connecting lines of linkage point 3 with said two connecting means 26 and 27 confine with each other an angle of 45°. Linked to the connecting point 27 by means of a coupling bolt 9 is that end of a link 28 which is adjacent the transmission housing 1. Near the central area of link 28 the lower end of a lifter rod 29 is pivotally connected to link member 28, whereas the upper end of lifter rod 29 is pivotally connected to lifter arm 14 of lifter shaft 16. That end of link member 28 which is remote from the transmission housing 1 is provided with a plow beam head 30 to which the plow beam 31 of a plow 32 is connected, said plow having two plowshares 20.

As will also be evident from FIG. 4, the two forces $Q_{v1}$ and $Q_{H1}$ are assumed to be effective at the linkage point 9. These two forces respectively originate from the horizontal and vertical forces acting upon the plowshares. The direction and magnitude of said forces are obtained in a manner similar to that described in connection with FIGS. 1 and 2. In conformity with the present invention, also in this instance force $Q_{v1}$ is supported in its line of action which means that the line of action extends along the connecting line of the two linkage points 3 and 27 of lever 25. Also in this instance, similar to the illustration of FIG. 3, the most favorable direction of measurement for the independence of component $Q_{v1}$ is ascertained as direction perpendicular to said component $Q_{v1}$. It may also be mentioned that the spreading of the two components $Q_{v1}$ and $Q_{H1}$ will to a great extent be affected by the linkage direction of lifter rod 29 at the lower link 28.

It may also be mentioned that when connecting saddle plows (Aufsattelpflüge) and trailer plows (Anhängepflüge), is is expedient to pivotally connect the lower links 10 and 28 (shown in FIGS. 1 to 4) to the linkage points 3b, 26 of levers 4 and 25 respectively so that also in this instance the force $Q_{H1}$ ascertained as auxiliary control force will be independent of force $Q_{v1}$.

The embodiment illustrated in FIG. 5 differs from that of FIGS. 1 to 3 in that the lifter rod 12 is pivotally connected to a lever 33. Lever 33 is mounted in a torsion-resistant and easily bendable manner on a shaft 34 which is journalled adjacent to transmission housing 1. The outer end of shaft 34 is provided with a shackle 35 to which link 10 of a three-point linkage system is linked. Coaxially arranged with regard to shaft 34 there is mounted adjacent transmission housing 1 an easily bendable and torsion resistant shaft which is coupled with shaft 34 and the outer end of which is likewise equipped with a shackle to which a lower link is pivotally connected similar to the arrangement 35, 10 described above. On transmission housing 1 at a point lower than shaft 2 there is provided a bearing stud 39 having pivotally journalled thereon a lever 38 employed for measuring forces $Q_{v1}$ and $Q_{H1}$. Lever 33 has a connecting bore 37 in which shaft 34 is journalled. The connecting line of bearing stud axis 39 with the projection of the axis of shaft 34, is, in conformity with the present invention, located along the line of action of force $Q_{v1}$ acting shaft 34. Force $Q_{v1}$ originates with the vertical force $B_v$ acting upon the plowshares. As will be evident from the drawing, when the tilting movement of lever 38 as produced by force $Q_{H1}$ is effected perpendicularly to the line of action of force $Q_{v1}$, there will be obtained an auxiliary control force for controlling the working depth, which auxiliary control force is independent of the force $Q_{v1}$ and thus of the force $B_v$.

The embodiment illustrated in FIG. 6 differs from that of FIGS. 1 to 3 in that a lifter rod 40 acts upon the upper link 22 of a three-point linkage system instead of having lifter rods 12 act upon the lower link. Lifter rod 40 is pivotally connected to a lifter arm 41 of the power operable lifting mechanism 8. A further difference between the embodiment of FIG. 6 and that of FIGS. 1 to 3 consists in that the auxiliary control force is ascertained through the intervention of the upper link 22. That end of the upper link 22 which is adjacent the transmission housing 1 is pivotally connected to an eye 42 of a slide 43 which is guided in a coulisse-like part 44 of the housing of the power lifting mechanism 8. Slide 43 rests upon a pressure spring 45 the other end of which rests upon an abutment of the housing of the power lifting mechanism 8. Pivotally connected to slide 43 is a link 6 which is coupled to shaft 7 of the control member of the power lifting mechanism 8.

As is also evident from FIG. 6, the axis of displacement of slide 43 is perpendicular to the vector of force $Q_{v1}$ which originates from force $B_v$ acting upon the plowshare and the direction and magnitude of which is obtained from the split-up of power $B_v$. Also, in this instance, the scanning of the displacement of the linkage point of the upper link 22 in slide 44 is effected in a direction perpendicular to the direction of action of force $Q_{v1}$. It may also be mentioned that the spreading of the angle between force $Q_{v1}$ and $Q_{H1}$ is adapted to be affected in a manner similar to that described in connection with the above outlined embodiments by changing the pivotal direction of the lifter rod 40 at the upper link 22 of the three-point linkage system.

With respect to the various embodiments of FIGS. 1 to 4 described above in which the connecting lines of the projection of the axis of the bearing stud 3 with the connecting points 9 and 26 confines an angle of 45°, it will be obvious from the above that such an arrangement makes it possible with plows built onto tractors to ascertain the force acting as auxiliary control force nearly independently of the vertical force effective in the system.

With the embodiment illustrated in FIG. 7, there is in addition to an embodiment designed in conformity with FIGS. 1 to 3, also illustrated the hydraulic part of the power lifting arrangement of the structure. The impulses of the pulling force component $Q_{H1}$ which are independent of vertical forces are conveyed to a collector lever 47 through the intervention of a control rod 6a of the linkage generally designated 6. The lower end of lever 47 is by means of a pivot 48 connected to control rod 6a. The upper end of lever 47 is by means of a pivot 49 pivotally connected to a two-arm lever 50 serving as operating or control lever of the control device. Lever 50 is tiltably journalled in a support 51 of the tractor. Lever 47 conveys the control impulses to an auxiliary control valve 52 (shown in its neutral position) of the control member of the hydraulic part of the power lifter arrangement. Valve 52 is operatively connected to lever 47 by means of a bolt 53 engaging an oblong opening 54 of lever 47.

The hydraulic part of the power lifter arrangement is supplied with fluid by a pump 55 which is continuously driven by the tractor motor (not shown). Pump 55 draws in fluid from a tank 57 through a conduit 56 and conveys the fluid under pressure through a conduit 58 to a branch point 59. Branch point 59 communicates through a conduit 60 through a check valve 61 with a branch point 62 and through a conduit 63 with a branch point 64. Connected to branch point 62 is a conduit 65 leading to a cylinder 66 of the power lifter the piston 67 of which is by means of a connecting rod 68 linked to a crank arm 69 of a lifter shaft 16. Lifter shaft 16 carries the two lifter arms 14, 15 by means of which the soil working device 20 (plowshare) is lifted or lowered.

Branch point 62 furthermore communicates through a conduit 70 with the valve 52 which is designed as a three-position valve. Valve 52 communicating through a conduit 71 with tank 57 also communicates through a conduit 72 with a branch point 73. Branch point 73 communicates through a conduit 74 through a choke 75 with a branch point 76 which through conduit 77 communicates with branch point 64 and through a conduit 78 communicates with main valve 79. Main valve 79 communicating through a conduit 80 with tank 57 has on the right-hand side (with regard to the drawing) provided a spring 81 and has its right-hand working chamber 82 through a conduit 83 in communication with the still-free branch of branch point 73. The left-hand working chamber 84 of main valve 79 communicates through a conduit 85 with branch point 64.

*Operation of the arrangement of FIG. 7*

It may be assumed that the arrangement of FIG. 7 occupies its neutral position shown in the drawing according to which the valve spool of auxiliary valve 52 occupies its intermediate position, and in which the valve spool of main valve 79 occupies its right-hand end position. It is further assumed that in this position, the pulling force maintaining member initiates a lifting impulse in view of the turning of the actuating lever 50 in counter-clockwise direction and in view of the valve spool of auxiliary valve 52 moving toward the left. As a result thereof, first conduits 72 and 71 are shut off by the valve spool of auxiliary valve 52. As a result thereof, between choke 75, valve spool of auxiliary valve 52, and in working chamber 83 of main valve 79, a pressure builds up which moves the valve spool of main valve 79 from its previous right-hand position to its left-hand end position thereby causing closure of conduit 78. As a result thereof, within the shut-off conduit system, a pressure builds up which acts upon piston 67 of the power lifter and through the connecting rod 68 thereof acts upon crank shaft 69 so that lifter shaft 16 turns in counter-clockwise direction. This turning movement continues until a counter-impulse of rod 6a occurs. When this is the case, i.e. when rod 6a due to a decrease in the pulling force is displaced toward the right, valve spool of valve 52 is moved to its neutral position, and conduits 71 and 72 again communicate with each other. The establishment of the communication between conduits 71 and 72 brings about that the pressure within working chamber 82 of main valve 79 drops and the pump merely circulates fluid without placing the fluid under pressure.

It may now be assumed that in the neutral position of valve 52, a lower impulse is initiated by moving the valve spool of valve 52 to its left-hand position by means of control rod 6 or by turning the actuating lever 50 in clockwise direction. It will be appreciated that conduits 70 and 72 communicate with conduit 71 which results in a discharge of the working fluid from cylinder 66 into tank 57, with the result that the device 20 will be lowered.

It is of course, to be understood that the present invention is, by no means, limited to the particular embodiments shown in the drawings but also comprises any modifications within the scope of the appended claims and is equally well applicable with soil working implements built onto the tractor as well as with soil working implements linked thereto.

What is claimed is:

1. In combination; a groundworking tool, a tractor, and a hitch structure connecting the tool to the tractor operable to transmit draft from the tractor to the tool and having power operable means to raise and lower the tool thereby to control the penetration of the tool into the ground; said hitch structure comprising substantially horizontal links means extending from the tractor to the tool and pivotally connected at least at the front end of the tractor, said power operable means comprising power means in the tractor and an arm tiltable on the tractor and driven by the power means, a lift bar pivoted at its upper end to said arm and at the lower end to said link means, control means for said power means adjustable for actuating said arm to vary the degree of engagement of the tool with the ground to control the draft load on the tractor, a control lever pivoted at a first point to said tractor and at a second point to said link means and forming the pivotal connection of the link means to the tractor, said lever being connected to said control means so pivotal movement of the control lever on the tractor will actuate said control means, a spring urging said control lever and control means in a direction to cause the said arm to move in a direction to increase the degree of engagement of the tool with the ground, said first and second points being so located that a line joining said points bears a relation to the direction of the link of said bar such that a first component of the force acting through said second point which sustains vertical loads on said tool also passes through said first point and exerts no torque on said control lever while a second component of the said force acting through said second point which sustains horizontal loads on said tool has a moment arm in respect of said first point and does exert a torque on said control lever, the direction of said second component being such as to develop a torque on said control lever which is opposite to the torque exerted on the control lever by said spring, whereby the position of said control lever is determined solely by said spring and the draft exerted on the said tool.

2. The combination according to claim 1 in which said first and second points are so located relative to each other that pivotal movement of said control lever under the influence of said second component will decrease the moment arm of said second component about said first point.

3. The combination according to claim 1 in which said control lever comprises a third point to which said link means can be connected, the lines connecting said second and third points with said first point including an angle of about 45° therebetween.

References Cited

UNITED STATES PATENTS

| Re. 25,415 | 7/1963 | Merritt et al. | 172—9 |
| Re. 25,512 | 1/1964 | Presnell et al. | 172—10 X |
| 2,688,908 | 9/1954 | Reaves | 172—7 |
| 3,022,830 | 2/1962 | Hess | 172—7 |
| 3,128,830 | 4/1964 | Doering | 172—7 |
| 2,968,353 | 11/1956 | Edman | 172—7 |
| 3,098,528 | 12/1960 | Richey et al. | 172—7 |

ABRAHAM G. STONE, *Primary Examiner.*

J. R. OAKS, *Assistant Examiner.*